May 11, 1948.  B. N. ENGLE ET AL  2,441,404
DEVICE FOR SETTING SAW TEETH
Filed June 18, 1946  3 Sheets-Sheet 1

INVENTOR.
BURR N. ENGLE
JOHN B. ENGLE
BY
Earl E. Moore
ATTORNEY

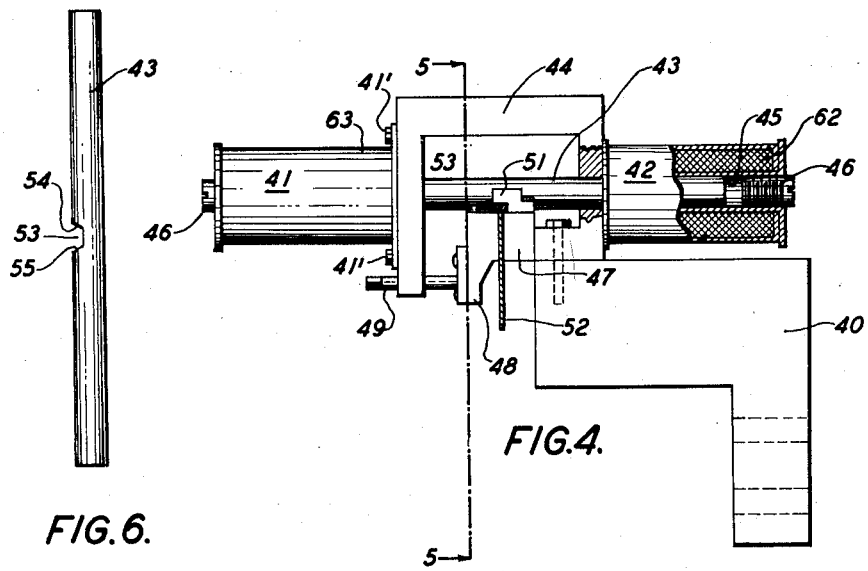
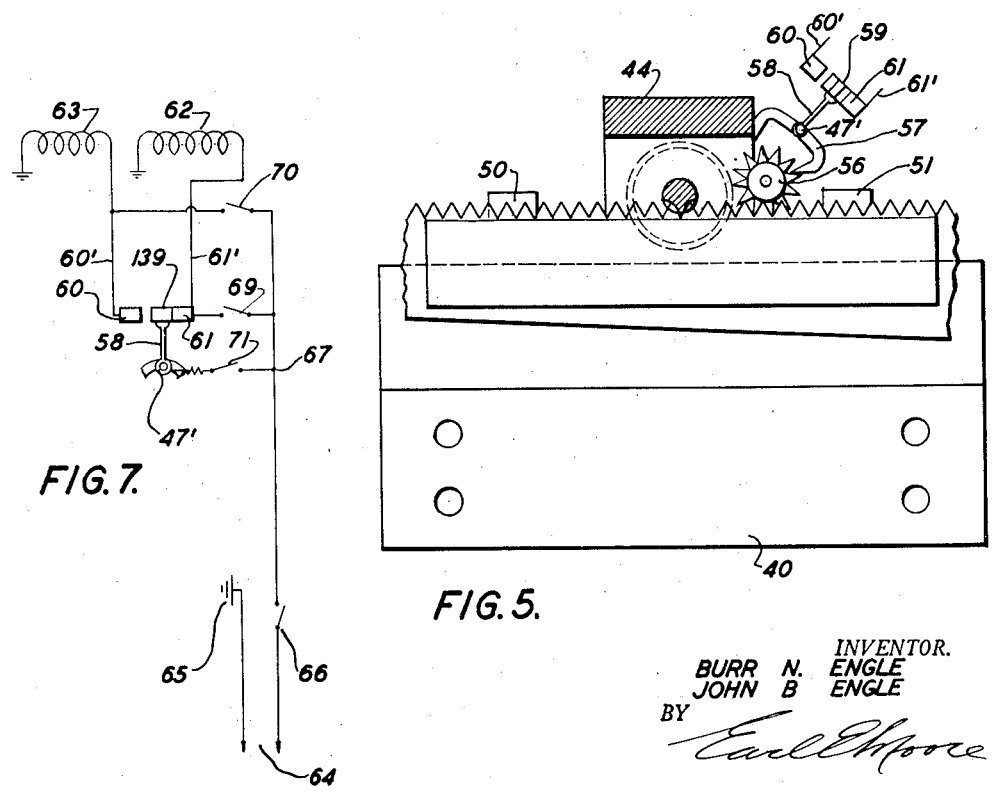

Patented May 11, 1948

2,441,404

UNITED STATES PATENT OFFICE 2,441,404

DEVICE FOR SETTING SAW TEETH

Burr N. Engle and John B. Engle,
Los Angeles, Calif.

Application June 18, 1946, Serial No. 677,617

4 Claims. (Cl. 75—66)

1

This application is a continuation in part of the invention set out in applicants' application Serial Number 603,288, filed July 5, 1945, and any great and minor details therein should be considered as a part of this application in so far that such are adaptable to the disclosure herein. In this instant application, a light portable hand device is disclosed for the purposes of setting teeth, and this form of the invention may be configurated similarly to that of a pistol or automatic side arm. With such a form of setter, the saw setter need only run the setter along one side of the saw blade and then reverse the procedure along the other side of the blade so as to set alternate teeth in opposite directions.

The second form of this invention is preferably a fixed unit and shows a double acting means for setting each tooth of the saw blade in consecutive order, this second form making it easy to set all the teeth of the saw blade by running the blade through the device just once.

The third form is clock-like operative device for setting teeth which is designed so that the clock-like means may be turned-off and a push button switch employed so that the worker can manually control each setting operation.

One of the principal objects of this invention is to present a new and novel tooth setter which is reliable in service, easy to operate, sturdy and convenient in construction, and which is economical to make and manufacture.

Other objects, advantages and features of our invention will appear from the accompanying drawings, the subjoined detailed description, the preamble of these specifications and the appended claims.

Applicants are about to illustrate and describe one of the forms of their invention in order to teach one how to make and use the same, but it is to be understood that the drawings and description thereof are not to limit the invention in any sense whatsoever, except as limited by the appended claims.

In the drawings:

Fig. 1 is a side elevation of a preferred form of the invention with parts broken away to show some important features in sectional view, Fig. 2 is a front elevational view of the device shown in Fig. 1, Fig. 3 is a rear elevational view of the top portion of the device shown in Fig. 1, but to a smaller scale, Fig. 4 is a side elevational view, partly in section, showing a modified form of the invention,

2

Fig. 5 is a vertical view taken substantially along the line 5—5 of Fig. 4,

Fig. 6 is an elevational view of a detailed part taken from Fig. 4,

Fig. 7 is schematic wiring diagram for the invention shown in Figs. 4 and 5,

Figure 1:
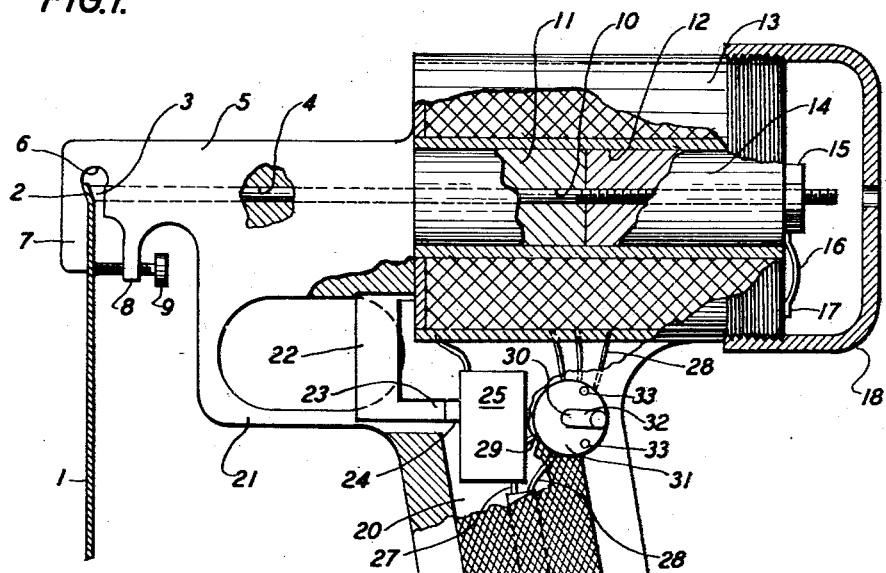
Figure 2:
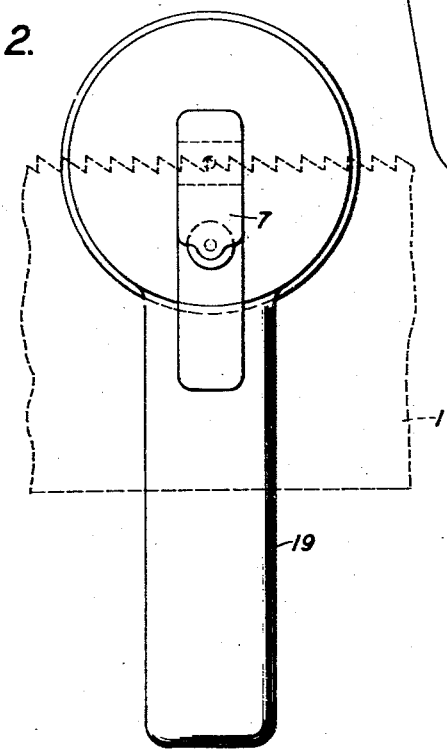
Figure 3:
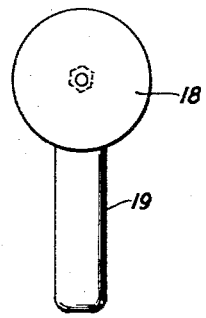

The preformed form of the invention is configurated somewhat like an automatic side arm or pistol and it is shown as being positioned upon a saw blade 1, one tooth 2 of which has already been shown as set by the tool end of a plunger 3. Any suitable means may be employed for supporting and holding the saw, if desired, such as, for instance, a bench vise.

The plunger 3 slides in a bore 4 of the working end or projection 5 of the setter which has an opening 6 to accommodate the upper edge of the saw and provide sufficient room for teeth movement of the saw blade. The working end has a forward depending lip 7 which is for providing a solid backing and guide for the saw blade, and this end also has another depending lip 8 which is rearward of the other lip and materially spaced therefrom so as to provide ample room for saw blade arrangement. When the arrangement is once made, a set screw 9 is adjusted to the surface of the blade and slightly spaced therefrom to act as a guide along with the lip 7.

The plunger 3 passes through the bore 10 of a magnetic intensifier plug 11 which may be threaded in the bore 12 of an electric magnet 13 so that it can be adjusted within the bore. The outer end of the plunger 3 is threaded and screwed into a threaded bore of a solenoid plunger 14 and upon the very end portion thereof, where it extends exteriorly of the solenoid plunger, there is a lock-nut 15. This lock-nut fixes the plunger 3 relative to the plunger 14 so that the extent of the blow of the plunger 3 can be adjusted to some extent. A ribbon spring 16 is fixed at 17 to the magnet and the other end is free but positioned under the lock-nut 15 so that this spring can continually urge the two plungers rearwardly until stopped by the rear cover 18 which is adjustably screwed onto the outer surface of the magnet.

The body portion of the setter comprises the handle means 19 which has a chamber 20 that houses a switching mechanism to be presently explained, and a trigger frame 21 which provides at the rear part thereof a guide means for a trigger 22. An extension 23 is sized and adapted to push a spring compressed button 24 of a micro switch 25. Since micro switches are now common to the trade, no particular description will be given for the one used in this invention. The electrical current, of suitable frequency and voltage, is supplied to the device through the two wire flexible cord 26 from any suitable source. One of the two wires 27 in the cord lead to the switch 25 and the other wire 28 leads directly to one side of the coil of the solenoid 13. A switch leg wire 29 leads from the switch to the central pivot point 30 of a voltage regular distributor element 31. The arm 32 thereof has a finger grip element at one end thereof which is adapted to make electrical contact with any one of a plurality of contacts 33 which have wire connection with various coil steps within the solenoid so as to energize portions of the coil and thus control the magnet force and the mechanical force of the plunger in the device. This control is needed in that some teeth on saws require different blow forces in order to properly set them.

Figs. 4 to 7 show another form of the invention wherein a wall bracket 40 is employed to support the working device which in this particular case includes the two electro-magnets 41 and 42 and the plunger 43. The magnets are supported upon a yoke 44, the base of which is bolted to the top of the bracket as shown. The magnet 42 has its iron clad shell welded or otherwise securely fixed to the bracket and the other magnet 41 has its iron clad shell securely bolted to the yoke as at 41' so that it can be removed when desired.

Each electro-magnet has a bore 45 adapted to receive one end of the plunger in sliding relation therewith, and within each bore at the threaded end thereof is a magnetic intensifying plug 46 which is threaded so that it can be adjusted within the bore and thus limit the movement of the plunger 43. Welded or otherwise fixed to the base of the yoke is an elongated block 47 in alinement with an adjustable vise-like elongated block 48, this latter block and block 47 providing the groove through which the saw blade is slid as its teeth are set. The block 48 is adjusted to position by the usual vise-like turn buckles 49 which are threaded through the outer lower end of the yoke as shown.

Guides 50 and 51 are fixed to and supported upon the block 47, and are designed to receive the top ends of the saw teeth and maintain the teeth in proper alinement for the setting operation, the blade of the saw is indicated at 52. The plunger is clearly shown in Fig. 6, but this is only one of the plungers in that other plungers are required for other sizes of saws requiring a different setting. At the center portion of the plunger is an opening or cut-away portion 53, the depth of the cut being sufficient to accommodate the teeth of the saw to be set, and the sides of the cut having the bevelled hammer surfaces 54 and 55. These surfaces are hardened and make sufficient forceful contact with opposite sides of alternate teeth of the saw to bend them, or set them, to their proper angle. Other plungers would be substituted for the one shown when larger or smaller teeth are to be set.

The means for controlling the operation of the plungers through their respective magnets is shown in Figs. 5 and 7, such means being omitted in Fig. 4 in order to better illustrate the device. A toothed wheel 56, having a plurality of teeth of substantially the same size as the saw's teeth which are to be set, is suitably journalled upon the block 47, and this wheel is provided with the escapement 57 which is suitably pivoted upon the block 47 as at 47'. The wheel is maintained in mesh relation with the saw teeth. This wheel may be changed to one having smaller or larger teeth when the teeth of the saw to be set demand it. The escapement has a stiff ribbon spring 58 which has upon the end thereof double headed electrical contact points 59, the opposite faces of which are adapted to alternately make good electrical contact with the fixed contact points 60 and 61. Insulated wires 60' and 61' extend from their respective contacts and make good connection with one end only of the windings 62 and 63 of the electro-magnets 41 and 42. The other ends of the coils are grounded to the metal yoke as well as with the block 47. The current supply indicated at 64 is preferably 110 volts, 60 cycle alternating current of the class now generally used for lighting purposes. One leg of the current supply is grounded to the block 47, as indicated at 65, and the other leg is broken by the single throw hand switch 66, but this line leads via of the switch to a point 67 where it branches off to make connection with the pivot point 47' of the escapement. A pair of hand switches 69 and 70 are provided, as shown, and these switches make connection with the wire leads from the contacts 60 and 61.

By the above arrangement, the escapement operates the magnets alternately so as to shift the plunger in opposite directions for the teeth setting job. The hand switches 69 and 70 being provided for hand control of the magnets when it is desired to do so; but when this is done, the hand switch 71 should be opened.

Figure 8:
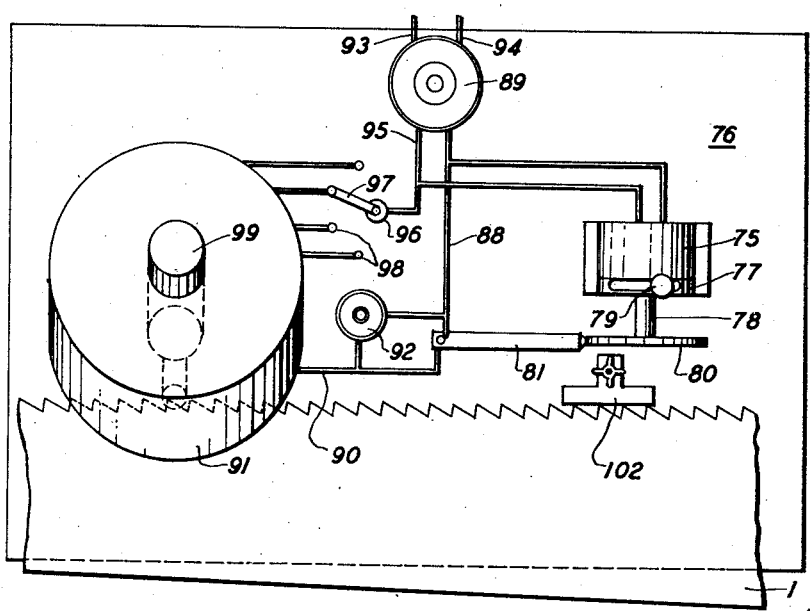
Fig. 8 is a plan view of another modified form of the invention.
Figure 9:
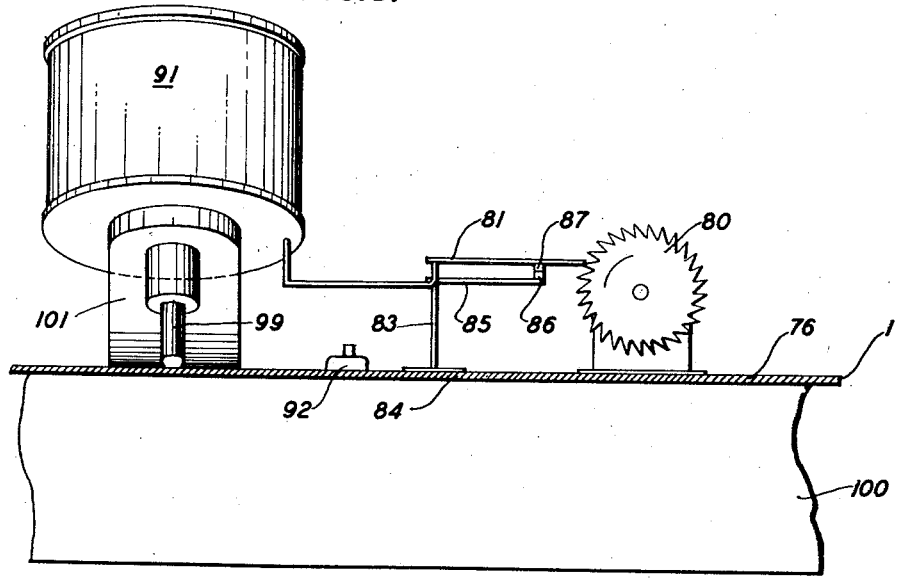
Fig. 9 is a front elevational view of Fig. 8.

The form of the invention shown in Figs. 8 and 9 is for regular automatic periodic operation of the setting device, the means for the control constituting an electric clock-like motor 75 which is mounted upon the base plate or table top 76. The shaft 78 of the motor (a synchronous speed motor) has its speed reduced by the reduction gears (not shown) in the case 77, the speed thereof being adjusted by the hand lever 79. Such motors and speed reduction gears are old in the art and it is believed unnecessary to explain their parts in detail.

Keyed to the shaft is a toothed wheel 80 which vibrates a springy reed 81, which is supported at the top thereof by the insulating stem 83 mounted upon the base 84. Also mounted upon the stem is a rigid arm 85 having the contact point 86 which is alined with a similar contact point 87 fixed to the reed 81. An insulated conductor wire 88 connects with a portion of the reed and leads to one side of the double pole hand switch 89, a branch of this wire leading to the motor 75. Another conductor 90 connects the arm 85 with one side or end of the electromagnet 91, the wires 88 and 90, however, being connectable through the push button type switch 92 when it is desired to operate the magnet independent of the automatic device employing the reed 81 and the arm 85.

The high side of the main switch 89 is connected to any source of suitable electric power by the conductors 93 and 94, and a conductor 95 leads from the switch to one side of the motor and to the pivot point 96 of the switch arm 97. This switch arm is adapted to make connection with any one of a number of electrical contact points 98 for controlling the amount of power in the magnet 91 in the manner previously mentioned for such an electromagnet. This magnet has the usual plunger 99 which is similar to the ones previously mentioned. The base which holds all the elements is indicated at 100, from which rises a bowed arm 101 that supports the coil and plunger in rigid position. Upon the base there are a number of adjustable guides 102 which are set to guide the tooth edge of the saw 1 along a definite straight path so that all the teeth are correctly set.

This form of the invention is provided with all incidentals, etc., as set out in the other forms, and it is hardly necessary to repeat in detail these now well known elements as this application is a continuation as set out in the preamble. In this latter form, the motor through its gearing arrangement can be set so that the plunger will produce one working stroke per second, or should this be a trifle fast for the workman, the timing can be set to produce one stroke of the plunger every two seconds.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described our invention, what is claimed as new and desired to be secured by Letters Patent is:

1. In a tooth setter device for saws and the like, a hand-grip means having fixed to one end thereof a guide and an electromagnet in alinement, a reciprocable plunger slideable in the electro-magnet and guide, means in the guide for accommodating a saw blade and the like for sliding action therethrough, means supplying electric current to the device, trigger means on the device for controlling the current to the electro-magnet.

2. In the tooth setter device recited in claim 1 wherein the means for accommodating the saw blade has an anvil in alinement with the plunger and adjustable means beneath the anvil to assure position of the blade but allow it to slip thereby.

3. In the tooth setter device recited in claim 1 wherein the trigger means includes a microswitch and adjustable means to limit the movement of the plunger, and means to adjust the strength of current to the electro-magnet.

4. In a tooth setter device for saw blades and the like, a main support consisting of a handle, a working unit fixed to the handle having an electro-magnet, plunger guide and trigger frame, a plunger reciprocable in the guide and electromagnet, an anvil at one end of the guide having means to receive an edge of a saw blade and allow it to slip therealong, means supplying electric current to the electro-magnet having a switch, a trigger in the trigger frame having means for operating the switch when it is shifted, a casing for the electro-magnet having a threaded end, a cap for covering the threaded end of the casing and meshed with the threads thereof and spring means for urging the plunger from the anvil.

BURR N. ENGLE.
JOHN B. ENGLE.

REFERENCES CITED

The following references are of record in the file of this patent:

UNITED STATES PATENTS

| Number | Name | Date |
|---|---|---|
| 1,373,308 | Davison | Mar. 29, 1921 |
| 1,819,139 | Weibull et al. | Aug. 18, 1931 |
| 1,853,695 | Mortimer | Apr. 12, 1932 |
| 1,924,431 | Zingheim | Aug. 29, 1933 |